(12) United States Patent
Letkeman et al.

(10) Patent No.: US 8,122,443 B2
(45) Date of Patent: Feb. 21, 2012

(54) DYNAMIC MULTI-CONTEXT DELTA VIEW FOR MERGING STRUCTURED DATA IN A VISUAL MERGE TOOL

(75) Inventors: Kim D. Letkeman, Neapean (CA); Duc N. Luu, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 1468 days.

(21) Appl. No.: 11/610,858

(22) Filed: Dec. 14, 2006

(65) Prior Publication Data

US 2008/0148221 A1    Jun. 19, 2008

(51) Int. Cl.
*G06F 9/44* (2006.01)

(52) U.S. Cl. ......... 717/168; 717/104; 717/169; 717/170

(58) Field of Classification Search ................. None
See application file for complete search history.

(56) References Cited

U.S. PATENT DOCUMENTS

| | | | |
|---|---|---|---|
| 6,604,236 B1 * | 8/2003 | Draper et al. | 717/170 |
| 7,058,941 B1 * | 6/2006 | Venkatesan et al. | 717/168 |
| 7,318,224 B2 * | 1/2008 | Honarvar et al. | 717/170 |
| 7,478,381 B2 * | 1/2009 | Roberts et al. | 717/168 |
| 7,581,217 B2 * | 8/2009 | Jhanwar et al. | 717/168 |
| 7,600,225 B2 * | 10/2009 | Sliger et al. | 717/169 |
| 2006/0015863 A1 * | 1/2006 | Vaidyanathan et al. | 717/170 |
| 2009/0064090 A1 * | 3/2009 | Anonsen et al. | 717/104 |

OTHER PUBLICATIONS

"CASEVision.TM./ClearCase User's Guide", 1994, 403 pages, <techpubs.sgi.com/library/manuals/2000/007.../007-2369-001. pdf>.*
Hayase et al., Revision control system using delta script of syntax tree, Sep. 2005, pp. 133-149, <http://delivery.acm.org/10.1145/1110000/1109138/p133-hayase.pdf>.*
Gill et al., A version-aware tool for design rationale, Nov. 2006, pp. 20-26, <http://delivery.acm.org/10.1145/1190000/1186599/p20-gill.pdf>.*

* cited by examiner

*Primary Examiner* — Thuy Dao
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for a dynamic multi-context delta view for merging structured data in a visual merge tool. In one embodiment of the invention, a method for providing a dynamic multi-context delta view can include rendering a compare view of a merged state for a selected model to include model controls each corresponding to a different model state for the selected model. The method further can include detecting a transient proximity event in connection with a particular one of the model controls. The method yet further can include identifying a corresponding model state for the particular one of the model controls. Finally, the method can include replacing the merged state with the corresponding model state in the compare view.

16 Claims, 3 Drawing Sheets

DYNAMIC MULTI-CONTEXT DELTA VIEW FOR MERGING STRUCTURED DATA IN A VISUAL MERGE TOOL

BACKGROUND OF THE INVENTION

1. Field of the Invention

The present invention relates to the field of artifact version control and more particularly to merging artifacts in a version control system.

2. Description of the Related Art

Version control relates to the management of different versions of artifacts produced through repetitive editing by one or more end editors. Often referred to in the context of source code development, software model development and configuration management, version control involves the management of one or more documents when the documents are edited in succession, parallel or both by one or more editors. Put plainly, version control addresses one of two likely contingencies. In a first contingency, an editor applies edits to a document in succession and requires a view to changes in the document from an ancestor version to a contemporary version. In the other contingency, one or more editors concurrently apply different edits to the same document and the edits must be merged into a unified document.

Merging is a common operation when working with versioned artifacts in a version control system. Wherever two or more editors apply edits to the same version of a file in parallel, a merge is required to harmonize the edits the parallel artifacts. Merging unstructured textual artifacts can be a relatively simple operation because within an unstructured textual artifact, there is no relationship from one line to the next. By comparison, merging a structured artifact such as source code or markup can be trying, as the skilled artisan will attest.

Notably, when editing an artifact, a simple line to line change can affect the integrity of structures or objects specified within the artifact. In this regard, the more structural the file content, the worse the problem because relationships between structures within an artifact must be maintained during a merge operation in order to protect the integrity of the artifact. Exacerbating matters, each element in an artifact can have multiple properties, each of which can contain or reference one or more other elements in the artifact. As other relationships can exist only in source code, the structure of an artifact can become exceedingly complex—so much so that attempting to edit the artifact within a mere text editor can virtually guarantee the corruption of the artifact as has been demonstrated by sufficient empirical evidence.

Thus, more sophisticated visual merge tools have become the preferred mode of performing a merge operation. The use of a visual merge tool in a version control system, however, is not without its own set of challenges. In this regard, each individual change can appear within the visual merge tool as a single artifact difference referred to in the art as a "delta". Yet, each individual change to an element in an artifact by a contributor reflected by a delta can be a candidate for conflict in view of a possible change to the same element by another contributor in another version of the artifact.

The typical merge user interface in a conventional visual merge tool includes multiple, concurrently displayed windows containing the merge contributors, often accompanied by an ancestor window and a merged file window. Some visual merge tools only optionally display the ancestor and the merged file, while others exclude the display of the ancestor and merged file entirely. Each approach is a compromise in usability designed to reduce clutter and to reduce the time taken to render the file content to the screen. In this regard, the clutter of multiple, concurrently displayed windows can be especially problematic when dealing with structured data viewed either hierarchically or diagrammatically as a substantial amount of screen real estate can be required to visualize all contributors and the merged model.

In order to accommodate the multiple, concurrent display of windows for the differences between the sources of change in structured data and the merged result, each window can be clipped and scroll bars enabled. In consequence, in order to visually identify the relevant differences in the structured data in each window, the end user must position the scroll bar controls to bring those differences into view in each window. The failure to do so will result in a difference going unnoticed and potentially unconsidered. Moreover, because different windows are used to visualize the differences, it is not possible always to place the windows in close enough proximity to one another to correlate differences in different windows. Consequently, to achieve correlation, the end user must mentally overlay the content of the different windows to visualize all differences.

Recognizing this deficiency, recent visual merge tools such as the Rational™ Software Architect™ version 6 manufactured by IBM Corporation of Armonk, N.Y., provides a software implementation of difference view overlay. The software implementation of the difference view overlay incorporates a button control in the compare view for the visual merge tool which when selected, displays a contributor or ancestor counterpart in any of the contributor or ancestor diagrams. Notwithstanding, the differentiation provided by the difference view overlay requires that the underlying model is rendered in a lighter color below the main model so as to allow the viewer to discern the two. As a result, while the overlay emphasizes positional changes, color and content changes can go unrecognized since the upper model hides the lower model.

BRIEF SUMMARY OF THE INVENTION

Embodiments of the present invention address deficiencies of the art in respect to visual merging of structured data and provide a novel and non-obvious method, system and computer program product for a dynamic multi-context delta view for merging structured data in a visual merge tool. In one embodiment of the invention, a method for providing a dynamic multi-context delta view can be provided for merging structured data. The method can include rendering a compare view of a merged state for a selected model to include model controls each corresponding to a different model state for the selected model. The method further can include detecting a transient proximity event in connection with a particular one of the model controls. The method yet further can include identifying a corresponding model state for the particular one of the model controls. Finally, the method can include replacing the merged state with the corresponding model state in the compare view.

In one aspect of the embodiment, the method also can include additionally rendering difference controls in the compare view. Each of the difference controls can correspond to a different model state for the selected model. In the aspect, the method further can include detecting a selection event in connection with a particular one of the difference controls and identifying a corresponding model state for the particular one of the difference controls. Finally, in the aspect of the embodiment, the method can include applying changes in the corresponding model state for the particular one of the difference controls to the merged state in the compare view.

In another embodiment of the invention, a version control data processing system can be provided. The system can be configured for merging structured data and can include a visual merge tool including a compare view, a data store of models coupled to the visual merge tool, and a multi-context delta view provided by the visual merge tool. The multi-context delta view can include a display of structure differences between a merged state for a selected one of the models and a different model state for the selected one of the models and a set of model user interface controls. Moreover, each of the controls can correspond to a different model state for the selected one of the models such as a left contributor state, an ancestor state and a right contributor state.

The multi-context delta view further can include program code enabled to detect a transient proximity event in connection with a particular one of the model user interface controls, to identify a corresponding model state for the particular one of the model user interface controls, and to replace the merged state with the corresponding model state in the display of structure differences. For instance, the transient proximity event can include a mouse-over event. In this way, rapid applications of mouse-over events to different ones of the model user interface controls can provide a strong visual correlation of changes to the ancestor model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for a dynamic multi-context delta view for merging structured data in a visual merge tool. In accordance with an embodiment of the present invention, changed versions of an ancestor model can be loaded for viewing in a compare view of structural differences within the visual merge tool. Model user interface controls, each corresponding to a different one of the changed versions, can be disposed in the compare view and configured to respond to mouse-over events. In response to a mouse over event detected in a particular one of the model user interface controls, a corresponding one of the changed versions of the ancestor model can be displayed in the compare view to the exclusion of other versions of the ancestor model. In this way, rapid applications of mouse-over events to different ones of the model user interface controls can provide a strong visual correlation of changes to the ancestor model.

Figure 1A:
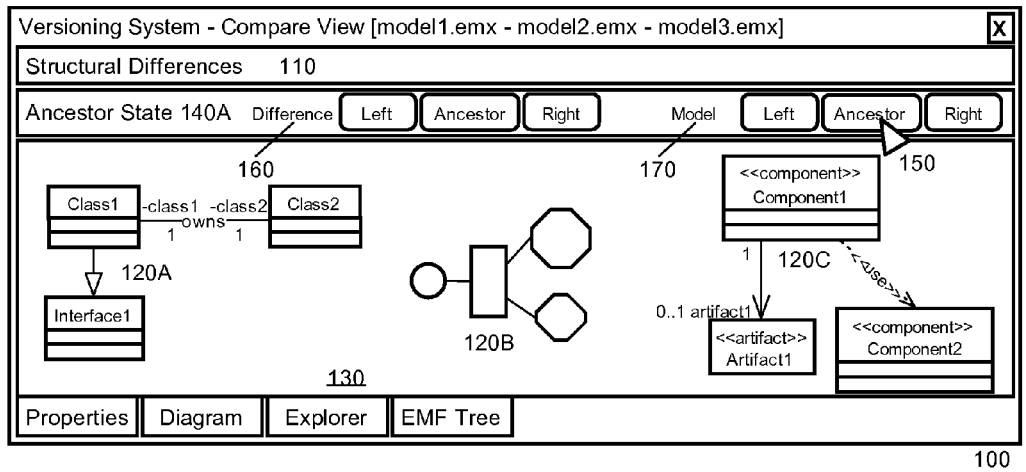
FIGS. 1A through 1D, taken together, are a pictorial illustration of a dynamic multi-context delta view for merging structured data in a visual merge tool.

In further illustration, FIGS. 1A through 1D, taken together, are a pictorial illustration of a dynamic multi-context delta view for merging structured data in a visual merge tool. As shown in FIG. 1A, a compare view 100 of a versioning system can be provided. The compare view 100 can include a display of structural differences 110 for different changes to artifacts in different contexts 120A, 120B, 120C of an underlying model. To that end, the compare view 100 can provide a multi-context delta view 130 showing only a single model at a given time.

Figure 1B:
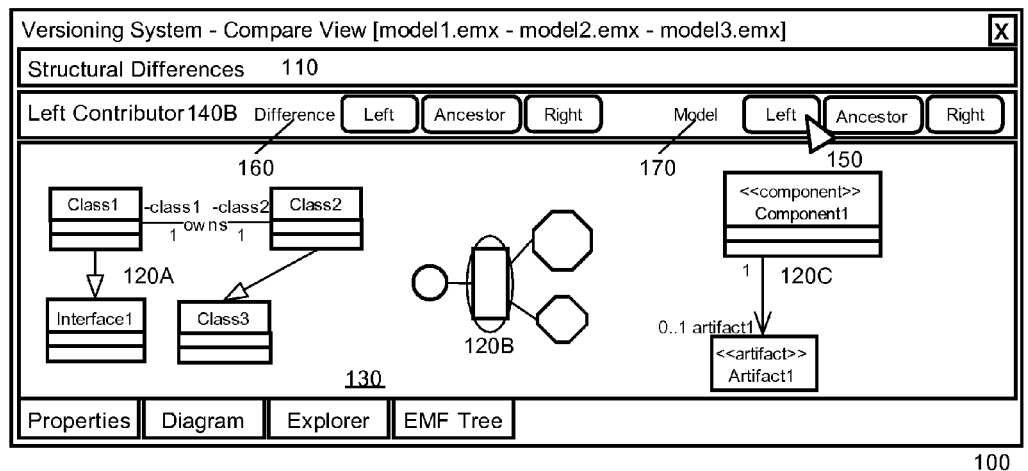
Figure 1C:
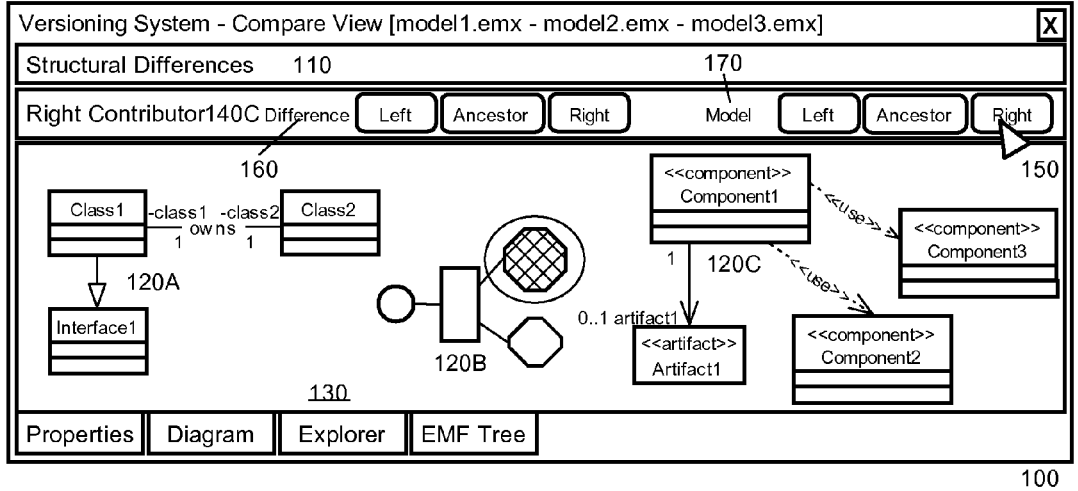
Figure 1D:
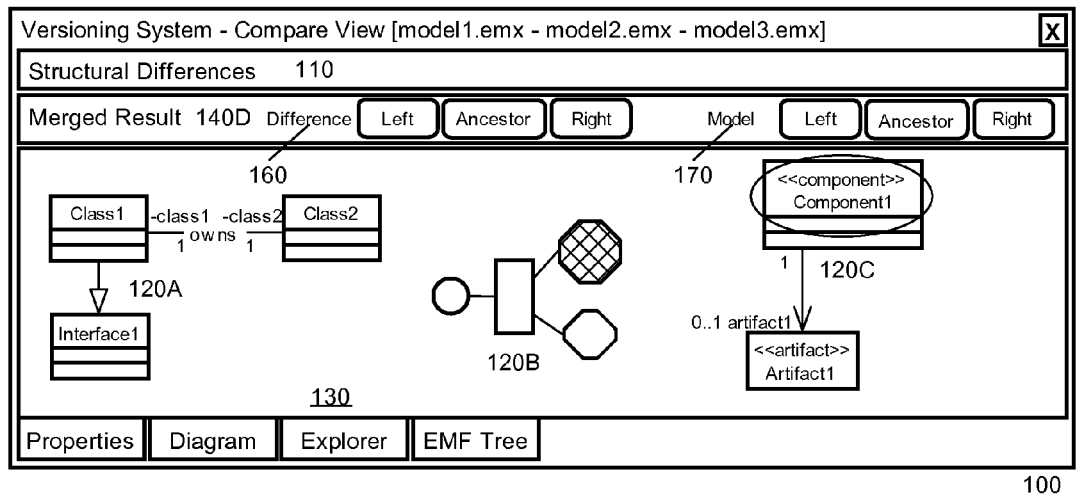

In this regard, as shown in FIG. 1A, an ancestor state 140A of the model is displayed in the multi-context delta view 130, whereas in FIG. 1B, a left contributor state 140A of the model is displayed in the multi-context delta view 130, in FIG. 1C, a right contributor state 140A of the model is displayed in the multi-context delta view 130, and in FIG. 1D, a merged state 140A of the model is displayed in the multi-context delta view 130. Importantly, the compare view 100 can include a set of model user interface controls 170 corresponding to the different states of the model.

For example, as shown in FIGS. 1A through 1D, the model user interface controls 170 can include individual controls corresponding to the left contributor state, ancestor state and right contributor state of the model, respectively. Each of the model user interface controls 170 can be coupled to program code (not shown) enabled to detect and respond to a transient proximity event, for example a mouse-over event produced by the proximity of a mouse pointer 150.

In response to detecting the transient proximity event, the program code of the model user interface controls 170 can be enabled to insert a view to a corresponding one of the model states into the display of structural differences 110 in place of an existing view to a model state. It will be apparent to the skilled artisan from FIGS. 1A through 1C, then, that the rapid movement of the mouse pointer 150 from one control to the next in the model user interface controls 170 can produce an animation of different states of the model in the display of structural differences 110, from left contributor (FIG. 1B), to ancestor (FIG. 1A) to right contributor (FIG. 1C). When removing the mouse pointer 150 from the model user interface controls 170, a merged state (FIG. 1D) can be shown. As such, a correlation of different changes to the model across states will become visually apparent to the end user without requiring an obscuring physical overlay of all views to the different states.

Optionally, the compare view 100 can include a set of difference user interface controls 160 again corresponding to the different states of the model. For example, as before, the difference user interface controls 160 can include individual controls corresponding to the left contributor state, ancestor state and right contributor state of the model, respectively. Each of the difference user interface controls 160 can be coupled to program code (not shown) enabled to detect and respond to a selection event. In response to detecting a selection event in a particular one of the difference user interface controls 160, the changes associated with a corresponding model state can be applied to a merged state of changes. A repeated selection of each of the difference user interface controls 160 can result in a toggling of the application and removal of changes associated with a corresponding model state to the merged state.

Figure 2:
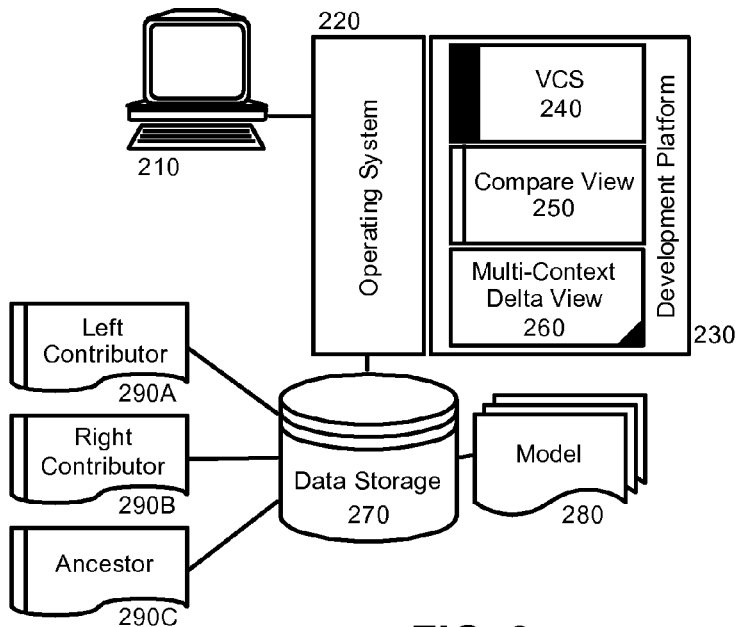
FIG. 2 is a schematic illustration of a visual merge data processing system configured for providing a dynamic multi-context delta view for merging structured data; and, FIG. 3 is a flow chart illustrating a process for providing a dynamic multi-context delta view for merging structured data in a visual merge tool.

Turning now to FIG. 2, a schematic illustration of a visual merge data processing system is shown to be configured for providing a dynamic multi-context delta view for merging structured data. The system can include a host computing platform 210 hosting an operating system 220. The operating system 220 can support the operation of a development platform 230. Data storage 270 also can be provided into which different models 280 can be stored for use in the development platform 230. Finally, the development platform 230 can include a version control system 240 configured to process different versions of the models 280.

In this regard, for a given one of the models 280, different versions of a given one of the models 280 can be merged into a merged state. The different versions can be represented as a left contributor state 290A, a right contributor state 290B and an ancestor state 290C. As shown in FIG. 2, the version control system 240 can provide a compare view 250 of the left contributor state 290A, a right contributor state 290B and an ancestor state 290C. Through the compare view 250, different changes reflected in each of the left contributor state 290A and right contributor state 290B can be applied to the ancestor state 290C to produce a merged state of the model (not shown).

Importantly, a multi-context delta view 260 can be disposed in the compare view 250. The multi-context delta view 260 can provide a selection of model controls corresponding to the left contributor state 290A, ancestor state 209C and right contributor state 290B of a selected one of the models 280. Each of the model user interface controls can be coupled to program code (not shown) enabled to detect and respond to a transient proximity event, and in response, the program code can be enabled to insert a view to a corresponding one of the model states 290A, 290B, 290C into the multi-context delta view 260.

Figure 3:
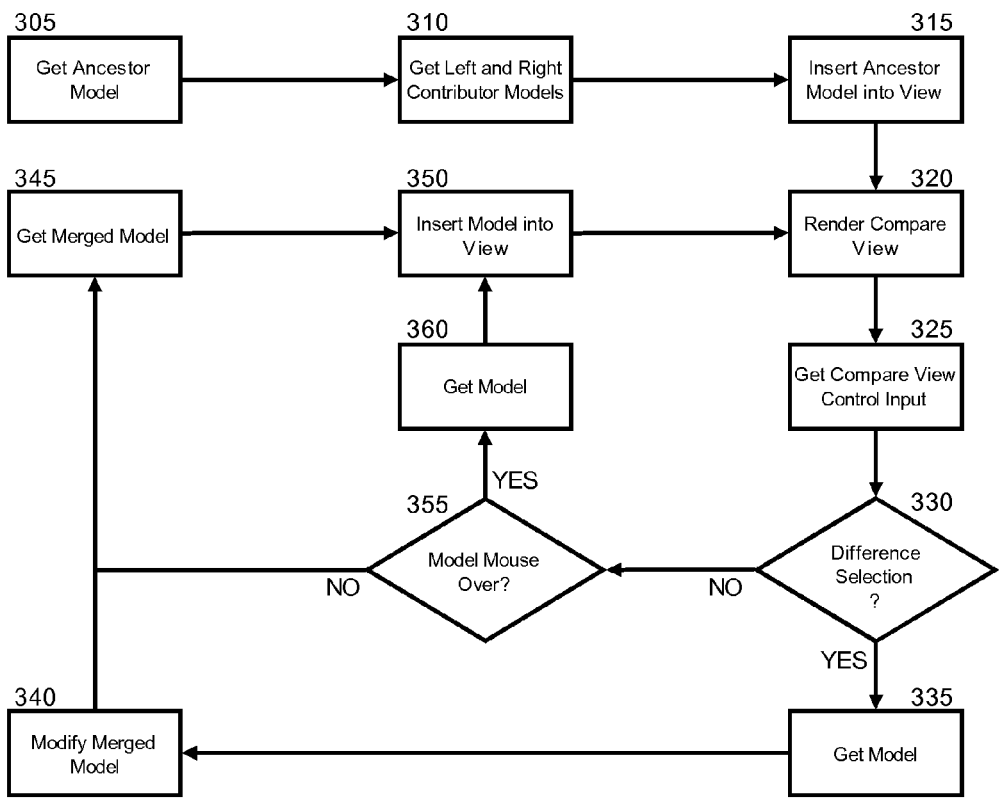

In yet further illustration of the operation of the multi-context delta view 260, FIG. 3 is a flow chart illustrating a process for providing a dynamic multi-context delta view for merging structured data in a visual merge tool. Beginning in block 305, an ancestor state of a subject model can be retrieved, and in block 310, a left contributor state and a right contributor state of the subject model can be retrieved. In block 315, the ancestor state of the subject model can be inserted initially into the compare view as representative of the merged model lacking any merged changes at first. Thereafter, in block 320, the compare view can be rendered for interactivity with an end user.

In block 325, control input can be received for the compare view including control selection events and transient proximity events such as a mouse over. In decision block 330, if a received control event is a selection of a difference button for a corresponding model state, in block 335, the corresponding model state can be retrieved and in block 340, the changes in the corresponding model state can be applied to the merged model in block 340. Alternatively, if the changes in the corresponding model state already have been applied to the merged model, then those changes can be removed from the merged model. In either case, in block 345 the merged state of the model can be retrieved and in block 350, the merged state of the model can be inserted into the compare view.

Returning to decision block 330, if the control event is not a selection of a difference button, in decision block 355, it can be determined if the control event is a transient proximity event such as a mouse-over. If not, the merged state of the model can be retrieved and in block 350, the merged state of the model can be inserted into the compare view. However, if the control event is a transient proximity event such as a mouse-over, in block 360 the corresponding model state can be retrieved and, in block 350, the retrieved model state can be inserted into the compare view.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method executed by a processor for providing a dynamic multi-context delta view for merging structured data, the method comprising:
   rendering a compare view of a merged state for a selected model to include model controls each corresponding to a different model state for the selected model;
   detecting a transient proximity event in connection with a particular one of the model controls;
   identifying a corresponding model state for the particular one of the model controls; and,
   replacing the merged state with the corresponding model state in the compare view.

2. The method of claim 1, further comprising:
   additionally rendering difference controls in the compare view, each of the difference controls corresponding to a different model state for the selected model;
   detecting a selection event in connection with a particular one of the difference controls;
   identifying a corresponding model state for the particular one of the difference controls; and,
   applying changes in the corresponding model state for the particular one of the difference controls to the selected model in the compare view.

3. The method of claim 2, wherein additionally rendering difference controls in the compare view, each of the difference controls corresponding to a different model state for the selected model, comprises additionally rendering three difference controls in the compare view corresponding respectively to a left contributor model state, an ancestor model state and a right contributor model state.

4. The method of claim 1, further comprising:
   additionally detecting a new transient proximity event in connection with a different one of the model controls;

identifying a different model state for the different one of the model controls; and, replacing the corresponding model state with the different model state in the compare view.

5. The method of claim 1, wherein rendering a compare view of a merged state for a selected model to include model controls each corresponding to a different model state for the selected model, comprises rendering a compare view of a merged state for a selected model to include three model controls corresponding respectively to a left contributor model state, an ancestor model state and a right contributor model state.

6. The method of claim 1, wherein detecting a transient proximity event in connection with a particular one of the model controls, comprises detecting a mouse-over event in connection with a particular one of the model controls.

7. A version control data processing system configured for merging structured data, the system comprising:
    a visual merge tool stored and executing in memory of a computer, the tool comprising a compare view;
    a data store of models coupled to the visual merge tool; and,
    a multi-context delta view provided by the visual merge tool, the multi-context delta view comprising:
    a display of structure differences between a merged state for a selected one of the models and a different model state for the selected one of the models and a set of model user interface controls, each of the controls corresponding to a different model state for the selected one of the models,
    the multi-context delta view further comprising program code enabled to detect a transient proximity event in connection with a particular one of the model user interface controls, to identify a corresponding model state for the particular one of the model user interface controls, and to replace the merged state with the corresponding model state in the display of structure differences.

8. The system of claim 7, wherein the transient proximity event is a mouse-over event.

9. The system of claim 7, wherein the multi-context delta view further comprises a set of difference user interface controls, each of the difference user interface controls corresponding to a different model state for the selected one of the models,
    the multi-context delta view yet further comprising additional program code enabled to detect a selection event in connection with a particular one of the difference user interface controls, to identify a corresponding model state for the particular one of the difference user interface controls, and to apply changes in the corresponding model state for the particular one of the difference controls to the merged state in the display of structure differences.

10. The system of claim 7, wherein the different model state for the selected one of the models, comprises a model state selected from the group consisting of a left contributor state, an ancestor state and a right contributor state.

11. A computer program product comprising a non-transitory computer usable medium embodying computer usable program code for providing a dynamic multi-context delta view for merging structured data, the computer program product comprising:
    computer usable program code for rendering a compare view of a merged state for a selected model to include model controls each corresponding to a different model state for the selected model;
    computer usable program code for detecting a transient proximity event in connection with a particular one of the model controls;
    computer usable program code for identifying a corresponding model state for the particular one of the model controls; and,
    computer usable program code for replacing the merged state with the corresponding model state in the compare view.

12. The computer program product of claim 11, further comprising:
    computer usable program code for additionally rendering difference controls in the compare view, each of the difference controls corresponding to a different model state for the selected model;
    computer usable program code for detecting a selection event in connection with a particular one of the difference controls;
    computer usable program code for identifying a corresponding model state for the particular one of the difference controls; and,
    computer usable program code for applying changes in the corresponding model state for the particular one of the difference controls to the merged state in the compare view.

13. The computer program product of claim 12, wherein the computer usable program code for additionally rendering difference controls in the compare view, each of the difference controls corresponding to a different model state for the selected model, comprises computer usable program code for additionally rendering three difference controls in the compare view corresponding respectively to a left contributor model state, an ancestor model state and a right contributor model state.

14. The computer program product of claim 11, further comprising:
    computer usable program code for additionally detecting a new transient proximity event in connection with a different one of the model controls;
    computer usable program code for identifying a different model state for the different one of the model controls; and,
    computer usable program code for replacing the corresponding model state with the different model state in the compare view.

15. The computer program product of claim 11, wherein the computer usable program code for rendering a compare view of a merged state for a selected model to include model controls each corresponding to a different model state for the selected model, comprises computer usable program code for rendering a compare view of a merged state for a selected model to include three model controls corresponding respectively to a left contributor model state, an ancestor model state and a right contributor model state.

16. The computer program product of claim 11, wherein the computer usable program code for detecting a transient proximity event in connection with a particular one of the model controls, comprises computer usable program code for detecting a mouse-over event in connection with a particular one of the model controls.

* * * * *